United States Patent
Esterberg et al.

(10) Patent No.: US 8,922,618 B2
(45) Date of Patent: Dec. 30, 2014

(54) MONITOR MOUNT

(75) Inventors: Dennis R Esterberg, Philomath, OR (US); Mark E Gorzynski, Corvallis, OR (US); Michael D. Derocher, Corvallis, OR (US); Timothy J Corbett, Corvallis, OR (US); Patrick Mceneany, Agoura Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 853 days.

(21) Appl. No.: 13/173,826

(22) Filed: Jun. 30, 2011

(65) Prior Publication Data

US 2013/0002803 A1    Jan. 3, 2013

(51) Int. Cl.
*H04N 7/14* (2006.01)

(52) U.S. Cl.
USPC .................................. 348/14.16; 348/825

(58) Field of Classification Search
USPC .............. 348/14.16, 825, 831; 248/200
See application file for complete search history.

(56) References Cited

U.S. PATENT DOCUMENTS

| | | | | |
|---|---|---|---|---|
| 4,575,033 | A * | 3/1986 | Henneberg et al. | 248/183.1 |
| 4,919,387 | A * | 4/1990 | Sampson | 248/371 |
| 5,330,147 | A * | 7/1994 | Volcheff et al. | 248/316.4 |
| 6,149,253 | A * | 11/2000 | Talasani | 312/7.2 |
| 6,343,006 | B1 | 1/2002 | Moscovitch et al. | |
| 7,287,729 | B2 * | 10/2007 | Jung et al. | 248/122.1 |
| 7,699,275 | B2 * | 4/2010 | Jang | 248/125.7 |
| 2006/0097999 | A1 | 5/2006 | Ditzik | |
| 2009/0261223 | A1 | 10/2009 | Nagaoka et al. | |
| 2011/0168063 | A1* | 7/2011 | Rotlevi et al. | 108/50.11 |
| 2011/0290971 | A1* | 12/2011 | Molter | 248/276.1 |
| 2012/0260830 | A1* | 10/2012 | Luiten | 108/6 |
| 2012/0314343 | A1* | 12/2012 | Ochoa | 361/679.01 |
| 2012/0320513 | A1* | 12/2012 | Truong et al. | 361/679.22 |
| 2012/0327566 | A1* | 12/2012 | Pennington et al. | 361/679.01 |

FOREIGN PATENT DOCUMENTS

| | | |
|---|---|---|
| WO | WO-0039493 | 7/2000 |
| WO | WO0039493 | 7/2000 |
| WO | WO-2004114237 | 12/2004 |
| WO | WO2004114237 | 12/2004 |

* cited by examiner

*Primary Examiner* — Olisa Anwah
(74) *Attorney, Agent, or Firm* — Hewlett-Packard Patent Department

(57) ABSTRACT

A technique includes configuring a monitor to be longitudinally translated along a work surface and pivoted about an axis that is substantially parallel to a normal of the work surface.

9 Claims, 4 Drawing Sheets

MONITOR MOUNT

BACKGROUND

A typical video conferencing system may include a monitor through which a participant may input graphical content and annotations. For example, in a conventional video conferencing system, the participant may use an input device such as a mouse to make selections on a graphical user interface (GUI) displayed on the monitor for such purposes as selecting content to be displayed in the video conference; annotating or highlighting a document that is displayed in the video conference; controlling a multimedia presentation; etc.

DETAILED DESCRIPTION

Figure 1:
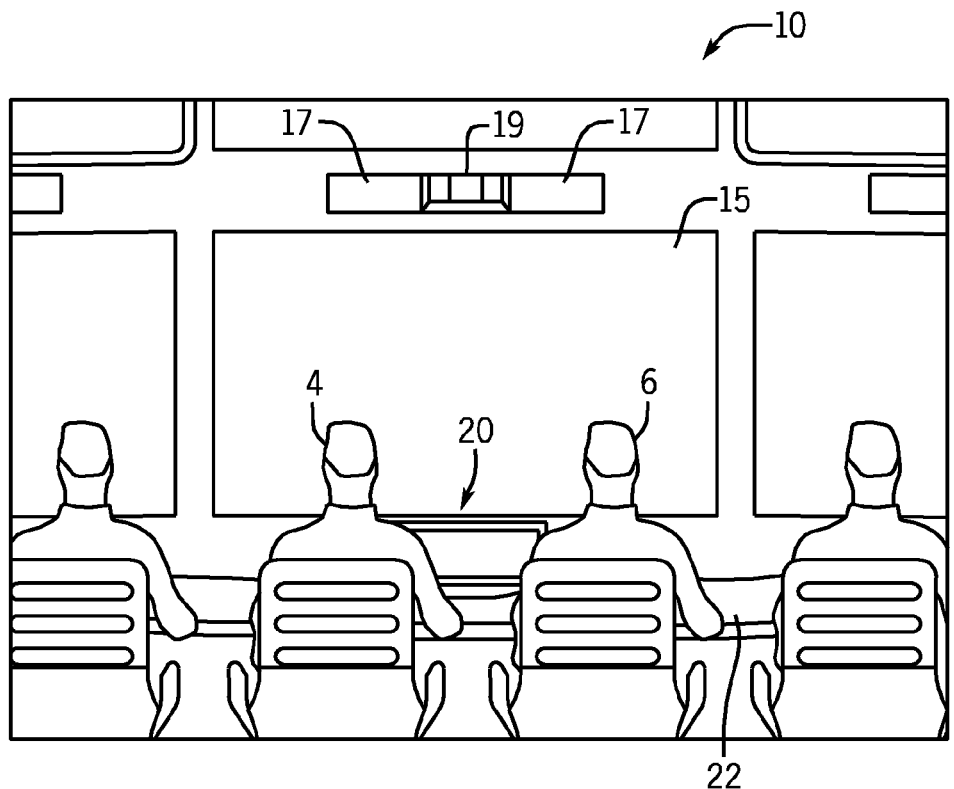
FIG. 1 is an illustration of a video conferencing endpoint according to an exemplary implementation.

FIG. 1 illustrates an exemplary video conferencing endpoint 10 in accordance with an example implementation. In general, the video conferencing endpoint 10 includes a video conferencing screen 15 on which participants view content associated with a video conference and touchscreen monitors for purposes of allowing the participants to manipulate and control this content. In this regard, participants may use the touchscreen monitors for such purposes as introducing and controlling the presentation of video conference exhibits (documents, multimedia presentations, videos, etc.); highlighting and annotating the exhibits; controlling sound and video content; and so forth. On such monitor is exemplary touchscreen monitor 20, which is depicted in FIG. 1 as being shared by teleconference participants 4 and 6. Among its other features, the video conferencing system endpoint 10 may include (as non-limiting examples) audio speakers 17, one or multiple microphones (not shown) and a video camera 19.

In general, each monitor, such as the touchscreen monitor 20, may be part of a computer system that stores information that may be accessed by conference participants by touching the monitor's screen, whether by a passive device such as a stylus (for implementations in which the touchscreen monitor employs a resistive touchscreen, for example) or by a participant's finger (for implementations that employ a capacitive touchscreen, for example). In a non-limiting exemplary implementation, the touchscreen monitor 20 may employ surface acoustic wave (SAW) technology for purposes of sensing the position of a participant's finger, although other types of monitors may be used, in accordance with other implementations.

One or multiple participants, such as exemplary participants 4 and 6, may share a given touchscreen monitor 20. As disclosed further herein, the touchscreen monitor 20 is mounted to a work surface 22 (the surface of a conference table, for example) in a manner that allows convenient fore-and-aft and pivotal positioning/repositioning of the touchscreen monitor 20 by either one of the participants 4 and 6 that share the monitor 20 for purposes of viewing the monitor 20 and entering input data into a graphical user interface (GUI) that may be displayed on the monitor's screen. In this manner, a given participant 4, 6 may interact with the GUI via the monitor's screen for any of the above-mentioned purposes.

In accordance with exemplary implementations, the touchscreen monitor 20 is generally inclined with respect to the work surface 22 at an angle that facilitates viewing of the monitor 20 by the participants 4 and 6, who, as depicted in FIG. 1, may be seated at a conference table onto which the touchscreen monitor 20 is disposed. As a non-limiting example, in accordance with example implementations, the front viewing plane of the monitor 20 may be inclined at approximately 33 degrees with respect to the work surface 22. In other words, the front viewing plane of the monitor 20 forms an angle of approximately 57 degrees with the normal to the work surface 22, in accordance with exemplary implementations.

Figure 2:
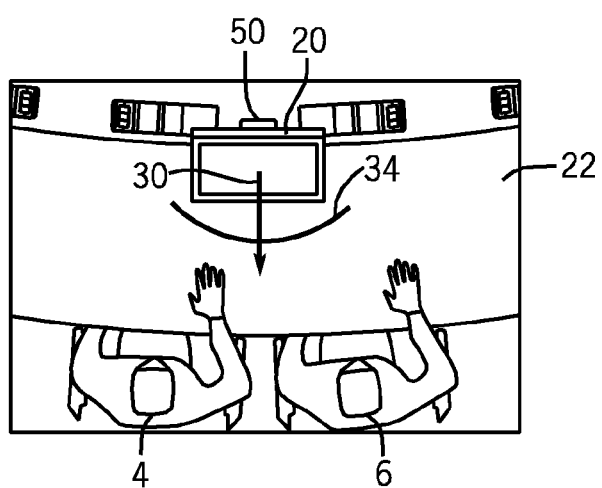
FIG. 2 is a top view of the video conferencing endpoint of FIG. 1 illustrating fore-and-aft positioning of a touchscreen monitor according to an example implementation.

Referring to FIG. 2 in conjunction with FIG. 1, in accordance with exemplary implementations, the touchscreen monitor 20 is attached, or mounted, to a mount assembly 50, which secures the monitor 20 to the work surface 22 but allows both fore-and-aft and pivotal positioning of the monitor 20 to facilitate the use of the monitor 20 by both participants 4 and 6 that share the monitor 20. In the example that is depicted in FIG. 2, the mount assembly 50 allows the touchscreen monitor 20 to be longitudinally translated back and forth (i.e., be subject to fore-and-aft positioning) along a straight path 30. Thus, either participant 4, 6 may pull or push the touchscreen monitor 20 for purposes of sliding the monitor 20 closer to the participant 4,6 or sliding the touchscreen monitor 20 farther away from the participant 4,6.

Figure 3:
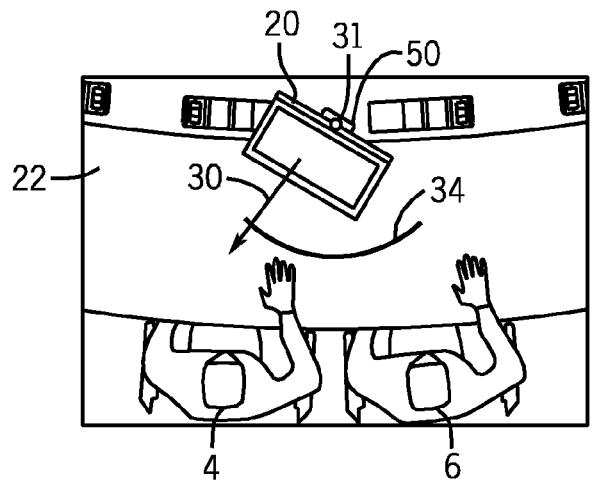
FIG. 3 is a top view of the video conferencing endpoint of FIG. 1 illustrating pivotal positioning of the touchscreen monitor according to an example implementation.

Referring to FIG. 3 in conjunction with FIG. 1, in addition to the fore-and-aft positioning, the mount assembly 50 also permits a given participant 4,6 to pivot the touchscreen monitor 20 about the normal to the surface 22 (illustrated by an exemplary normal axis 31 in FIG. 3) such that the participant 4,6 may rotate, or pivot, the touchscreen monitor 20 toward one participant 4,6 and away from the other participant 4,6. For the specific example that is depicted in FIG. 3, the participant 4 has rotated the touchscreen monitor 20 about the normal axis 31, i.e., moved the monitor 20 along an arcuate path 34.

As a non-limiting example, in the position of the touchscreen monitor 20, which is depicted in FIG. 3, the participant 4 may interact with the touchscreen monitor 20 for purposes of acquiring a better view of the monitor's screen and/or entering data, and thereafter, the particular 4 may pivot the touchscreen monitor 20 back to an intermediate position, such as the position that is depicted in FIG. 2, for purposes of permitting full viewing of the touchscreen monitor 20 by both participants 4 and 6. Similarly, participant 6 may pivot the touchscreen monitor 20 toward the participant 6 for purposes of acquiring a better view of the screen and/or entering data. Moreover, the participant 4, 6 may perform fore-and-aft positioning of the touchscreen monitor 20 at any of the monitor's pivotal positions, such as at any position along the arcuate path 34.

Figure 4:
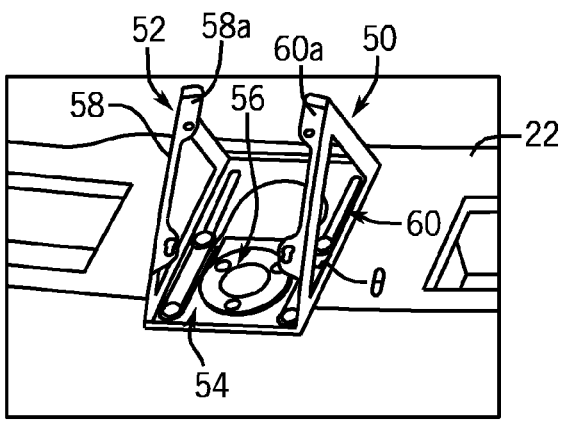
FIGS. 4 and 5 are perspective views of a mount assembly for the touchscreen monitor illustrating fore-and-aft and pivotal positioning of the monitor according to an example implementation.
Figure 5:
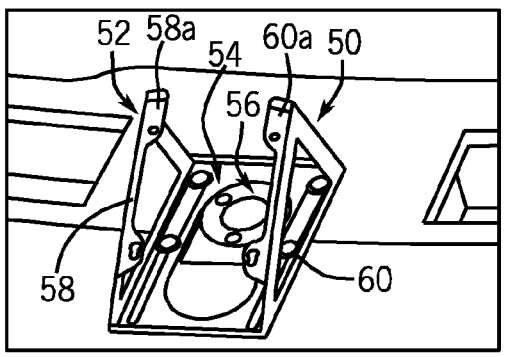
Figure 6:
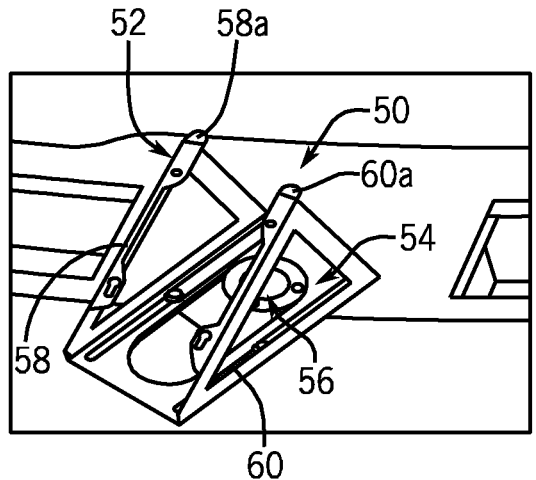
FIG. 6 is a perspective view of the mount assembly illustrating pivotal positioning of the touchscreen monitor according to an example implementation.

FIG. 4 depicts the mount assembly 50 in accordance with example implementations. In general, the mount assembly 50 includes a pivot mount assembly 56 that is constructed to secure the mount assembly 50 to the work surface 22 and permit a frame 52 that is attached, or mounted, to the touchscreen monitor 20 to pivot, as shown, for example, by comparing FIG. 4 to FIG. 6. The mount assembly 50 also includes a slide mount assembly 54 that is constructed to allow the frame 52 to longitudinally translate to permit fore-and-aft positioning of the touchscreen monitor 20, as shown, for example, by comparing FIG. 4 to FIG. 5.

Referring to FIG. 4, in accordance with an exemplary implementation, the frame 52 includes upwardly extending side sections 58 and 60 that have flanges 58a and 60a, respectively, which lie in the same inclined plane. This inclined plane, in turn, is generally parallel with the touchscreen monitor's viewing surface and is inclined an inclination angle (called "θ" herein) relative to the plane containing the immediate work surface 22. Thus, the flanges 58a and 60a may, in accordance with exemplary implementations, directly contact the touchscreen monitor 20 and may be mounted (via threaded fasteners, for example) to the monitor's rear mounting interface (not shown). Consistent with the touchscreen monitor's inclination discussed above, the inclination angle θ may be 33 degrees, in accordance with example implementations. Alternatively, the inclination angle θ may be an angle in a range between 30 to 40 degrees; may an angle that is greater than 40 degrees; or may be an angle that is less than 30 degrees, depending on the implementation.

Figure 7:
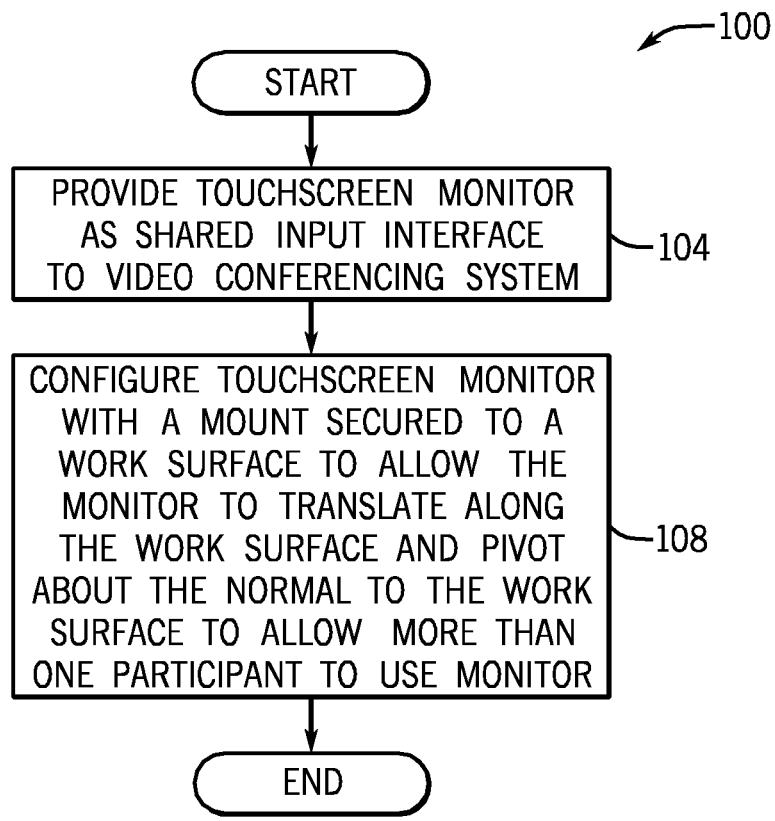
FIG. 7 is a flow chart depicting a technique to configure a touchscreen monitor using a mount assembly according to an example implementation.

Thus, referring to FIG. 7, to summarize, in accordance with example implementations, a technique 100 includes providing (block 104) a monitor, such as a touchscreen monitor, as a shared input interface (i.e., an input interface shared by more than one conference participant) to a video conferencing system. The technique 100 includes configuring (block 108) the touchscreen monitor with a mount that is secured to a work surface to allow the monitor to translate along the work surface and pivot about the normal to the work surface to allow more than one participant to use the monitor, pursuant to block 108.

Figure 8:
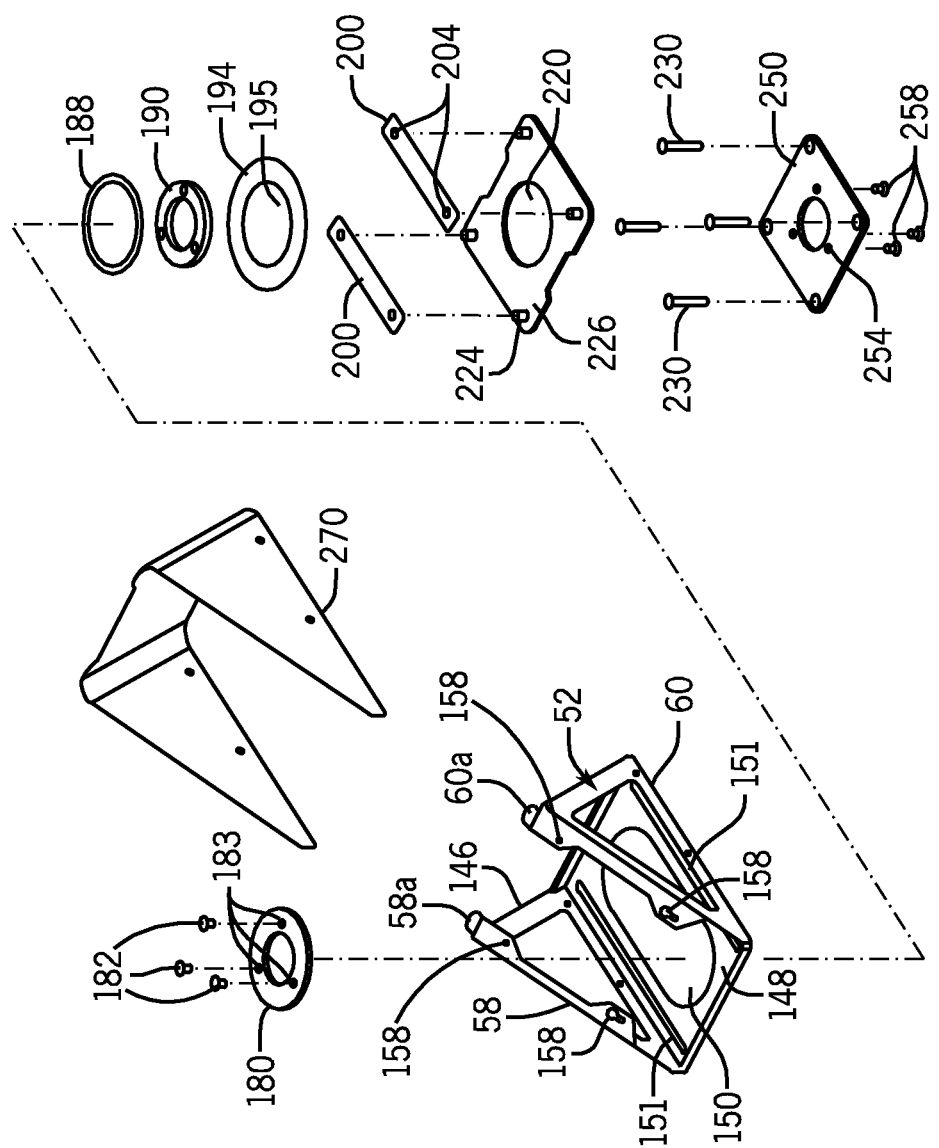
FIG. 8 is an exploded perspective view of the mount assembly according to an example implementation.

Referring to FIG. 8 in conjunction with FIG. 4, in accordance with exemplary implementations, the frame 52 may include a bottom section 148, which spans between the two upwardly extending side sections 58 and 60 of the frame 52. The bottom section 148 includes an elongated opening 150 through which the pivot mount assembly 56 extends and which allows the frame 52 to translate with respect to the pivot mount assembly 56, as further described below. The bottom section 148 also includes, in accordance with example implementations, channels 151 on either side of the opening 150, which form part of the slide mount assembly 54. In this manner, the channels 151 receive upwardly extending bosses 224 of a lower plate 226 that is secured to the work surface 22 via the pivot mount assembly 56 and disposed below the bottom section 148. Each boss 224, in turn, is confined to slide in a straight path by the respective channel 151. Because the plate 226 is constructed to rotate, or pivot, about the pivot mount assembly 56, the frame 52 pivots with the plate 226. However, the sliding connection established by the bosses 224 and channels 151 allow the frame 52 to slide with respect to the pivot mount 56.

To secure the frame 52 to the plate 226, longitudinally extending members 200 are disposed on either side of the opening and are attached to the top surfaces of the bosses 224 (via threaded fasteners (now shown), for example) to slidably secure the frame 52 to the plate 226. Moreover, the plate 226 contains a central opening 220 through which the pivot mount assembly 56 extends. As depicted in FIG. 8, in accordance with exemplary implementations, a cover 270 may be mounted to the sides 58 and 60 and the rear of the frame 52 (via threaded fasteners, for example).

In accordance with exemplary implementations, the pivot mount assembly 56 is formed from an upper pivot ring 180 that is sized to have an outer diameter that is larger than the diameter of the opening 220 of the plate 226. Therefore, when assembled to the other parts (described below) of the pivot mount assembly 56, the upper pivot ring 180 secures the frame 52 to the work surface 22. The upper pivot ring 180 is secured (via threaded fasteners 182, for example) to a lower pivot ring 190; and the lower pivot ring 190, in turn, is secured (via threaded fasteners 258, for example) to a lower plate 250 that is fixedly secured to the work surface 22 (via wood screws 230, for example). The lower pivot ring 190 is disposed inside the opening 220 of the plate 226, and a washer 188 (a nylon washer, for example) circumscribes the lower pivot ring 190 and is also disposed inside the opening 220. Another washer 194 (a nylon washer, for example) may reside between the upper pivot ring 180 and the plate 226. The washer 194 has an inner opening 195 that has a diameter that is sized larger than the outer diameter of the lower pivot ring 190 but smaller than the outer diameter of the upper pivot ring 180.

It is noted that the specific frame, pivot mount assembly and slide mount assembly that are disclosed herein are merely examples of a frame and assemblies that allow both fore-and-aft pivotal positioning of a monitor. Other frames and pivot and slide mount assemblies may alternatively be used, in accordance with other implementations. Moreover, although the frame 52 is described herein as positioning the touchscreen monitor 20 at a fixed angle of 33 degrees; the frame may incline the monitor at a different angle; and furthermore, the mount assembly may include a tilt adjustment assembly to permit the monitor to be inclined by the participant at an angle within a selectable range of angles, in accordance with other implementations. As another variation, the touchscreen monitor 20 may be replaced by a non-touchscreen monitor. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus comprising:
   a frame to mount to a monitor;
   a slide assembly connected to the frame to enable the monitor to be longitudinally translated the monitor along a work surface; and
   a pivot assembly connected to the frame to enable the monitor to be pivoted about an axis that is substantially parallel to a normal of the work surface, a first plate to fixedly mount the apparatus to the work surface, wherein the pivot assembly comprises at least one pivot ring connected to the plate and a second plate to pivot about said at least one pivot ring and
   the slide assembly comprises a channel and a pin to move inside the channel, wherein the pin and the channel are operatively connected to the frame and second plate to enable the frame to slide relative to the second plate.

2. The apparatus of claim 1, wherein the pivot assembly is to be mounted to the work surface.

3. The apparatus of claim 1, wherein the slide assembly is to slide relative to the pivot assembly.

4. The apparatus of claim 1, wherein the frame is to incline the monitor at an angle between 50 to 60 degrees relative to the normal.

5. The apparatus of claim 1, wherein the frame comprises a generally planar surface to attach to the monitor to substantially tilt the monitor relative to the work surface.

6. A system comprising:
  a touchscreen monitor to be used by a plurality of participants as an input device for a video conferencing system; and
  a mount assembly attached to the touchscreen monitor, the mount assembly adapted to configure the monitor to be used by a first participant of the plurality of participants to:
    pivot the monitor away from a second participant of the plurality of participants and toward the first participant, and
    longitudinally translate the monitor to allow fore-and-aft positioning of the monitor relative to the first participant,
  wherein the mount assembly comprises a first plate to fixedly mount the system to the work surface, and further comprises a pivot assembly and a slide assembly,
  wherein the pivot assembly comprises at least one pivot ring connected to the first place and a second plate to pivot about said at least one pivot ring, and
  wherein the slide assembly comprises a channel and a pin to move inside the channel, wherein the pin and the channel are operatively connected to the frame and second plate to allow the frame to slide relative to the second plate.

7. The system of claim 6, wherein the mount assembly allows rotation of the monitor and the slide assembly allows the fore-and-aft positioning of the monitor, the slide assembly being slidably mounted to the pivot assembly.

8. The system of claim 6, wherein the mount assembly is configured to angle between 50 to 60 degrees relative to the normal.

9. The system of claim 6, wherein the touchscreen monitor comprises a monitor to use surface acoustic waves to sense input.

* * * * *